United States Patent
Ma et al.

(10) Patent No.: US 7,848,872 B2
(45) Date of Patent: Dec. 7, 2010

(54) METHOD AND APPARATUS FOR MONITORING RECIRCULATED EXHAUST GAS IN AN INTERNAL COMBUSTION ENGINE

(75) Inventors: Qi Ma, Farmington Hills, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 395 days.

(21) Appl. No.: 11/960,960

(22) Filed: Dec. 20, 2007

(65) Prior Publication Data

US 2009/0164105 A1 Jun. 25, 2009

(51) Int. Cl.
*G06F 17/00* (2006.01)
*F02B 47/08* (2006.01)
*F02M 25/07* (2006.01)

(52) U.S. Cl. ............. 701/108; 123/568.21; 123/568.23; 123/568.24; 123/568.25; 123/568.26; 123/568.27

(58) Field of Classification Search ............ 123/568.21, 123/568.23, 568.24, 568.25, 568.26; 701/108; 60/605.2
See application file for complete search history.

(56) References Cited

U.S. PATENT DOCUMENTS

| | | | |
|---|---|---|---|
| 4,823,760 A | 4/1989 | Nishida | |
| 5,205,260 A * | 4/1993 | Takahashi et al. | ............ 123/494 |
| 5,934,249 A | 8/1999 | Nanba et al. | |
| 6,009,862 A * | 1/2000 | Wanat et al. | ............ 123/568.22 |
| 6,378,515 B1 * | 4/2002 | Geyer | ......................... 123/683 |
| 6,640,775 B2 | 11/2003 | Itoyama et al. | |
| 7,104,260 B2 | 9/2006 | Nakazawa et al. | |
| 7,587,888 B2 * | 9/2009 | Shirakawa | ................... 60/278 |
| 2004/0045526 A1 * | 3/2004 | Kolmanovsky et al. | ..... 123/399 |

* cited by examiner

*Primary Examiner*—Stephen K Cronin
*Assistant Examiner*—Raza Najmuddin

(57) ABSTRACT

A method for controlling EGR gas flow in an internal combustion engine during ongoing operation includes determining an engine operating point and a preferred EGR fraction for a cylinder charge based upon the engine operating point. A feed-forward command for controlling an external EGR gas flowrate to an engine intake manifold based upon the preferred EGR fraction for the cylinder charge is determined. An EGR ratio in the intake manifold is determined. And, the external EGR gas flowrate is controlled based upon the estimated EGR ratio in the intake manifold and the feed-forward command for controlling the external EGR gas flowrate.

14 Claims, 2 Drawing Sheets

METHOD AND APPARATUS FOR MONITORING RECIRCULATED EXHAUST GAS IN AN INTERNAL COMBUSTION ENGINE

TECHNICAL FIELD

This disclosure pertains to internal combustion engines.

BACKGROUND

Internal combustion engines recirculate exhaust gas to engine intake systems to reduce peak combustion temperatures to manage engine-out emissions. Known systems accomplish such recirculation using exhaust gas flow control systems that are internal to the combustion chamber and external recirculation systems referred to as exhaust gas recirculation ('EGR') systems. EGR gas flowrate, engine intake air characteristics, and pressure and temperature dynamics in the engine intake affect mass ratio of EGR gas and fresh air in the intake and in a cylinder charge, thus affecting combustion temperature, engine power, and engine-out emissions. The effect on the mass ratio of EGR gas and fresh air increases at high EGR dilution levels, such as can occur during lean-idle operation of a spark-ignition direct-injection engine.

SUMMARY

A method for controlling EGR gas flow in an internal combustion engine during ongoing operation includes determining an engine operating point and a preferred EGR fraction for a cylinder charge based upon the engine operating point. A feed-forward command for controlling an external EGR gas flowrate to an engine intake manifold based upon the preferred EGR fraction for the cylinder charge is determined. An EGR ratio in the intake manifold is determined. And, the external EGR gas flowrate is controlled based upon the estimated EGR ratio in the intake manifold and the feed-forward command for controlling the external EGR gas flowrate.

BRIEF DESCRIPTION OF THE DRAWINGS

One or more embodiments will now be described, by way of example, with reference to the accompanying drawings, in which.

DETAILED DESCRIPTION

Figure 1:
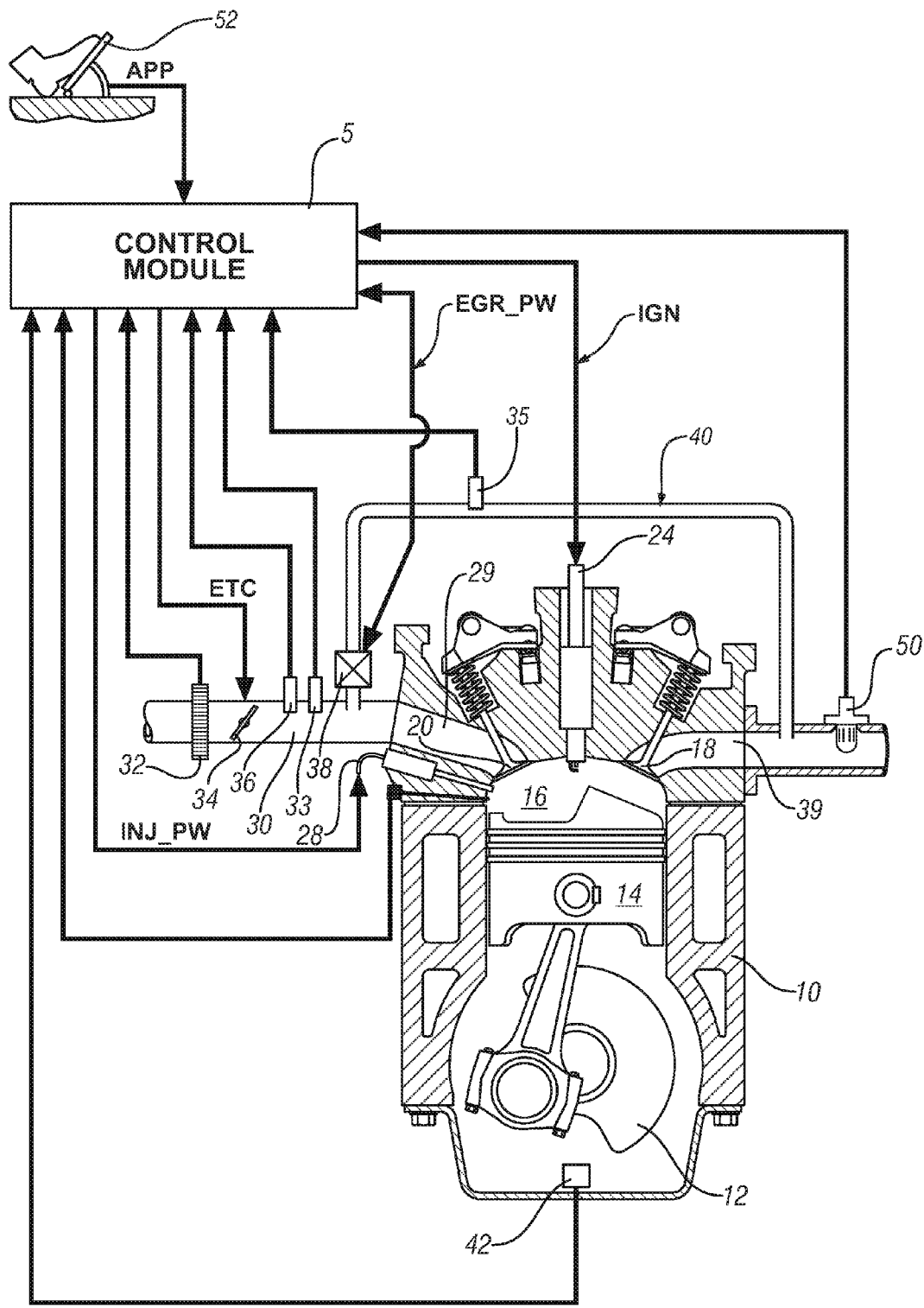
FIG. 1 is a schematic diagram of an engine, in accordance with the present disclosure; and, FIG. 2 is a schematic diagram of an algorithmic flowchart, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The exemplary engine 10 by which the disclosure is illustrated comprises a multi-cylinder spark-ignition, direct injection, four-stroke internal combustion engine operative in a repetitive combustion cycle comprising intake, compression, power, and exhaust strokes. The disclosure can be applied to various internal combustion engine systems and combustion cycles.

The engine 10 comprises a plurality of cylinders having reciprocating pistons 14 slidably movable therein which define variable volume combustion chambers 16. Each of the pistons 14 is connected to a rotating crankshaft 12 by which linear reciprocating motion is translated to rotational motion. A crank sensor 42 monitors crankshaft rotational position and speed. One or more intake valve(s) 20 controls air flow from an intake passage 29 into each of the combustion chambers 16. One or more exhaust valve(s) 18 controls flow of exhaust gases from each of the combustion chambers 16 to an exhaust manifold via an exhaust passage 39. Openings and closings of the intake and exhaust valves 20 and 18 are preferably controlled with a dual camshaft (as depicted), the rotations of which are linked and indexed with rotation of the crankshaft 12. An exhaust gas sensor 50 monitors the exhaust gas, including, e.g., a state of a parameter correlatable to engine-out air/fuel ratio or a constituent of the exhaust gas.

An air intake system comprises airflow ductwork and devices for controlling and monitoring the air flow to the intake passage 29. In this embodiment the air intake system channels flow of intake air to an intake manifold 30 which directs and distributes the intake air into the intake passage 29 leading to the combustion chamber 16 through the intake valve(s) 20. The devices for controlling and monitoring the airflow in the intake manifold 30 preferably include: a mass airflow sensor 32, a throttle valve 34, a pressure sensor 36, and a temperature sensor 33. The mass airflow sensor 32 monitors mass airflow and intake air temperature. The throttle valve 34 preferably comprises an electronically controlled device which controls air flow to the engine 10 in response to a control signal ('ETC') from the control module 5. The pressure sensor 36 monitors intake manifold absolute pressure and barometric pressure. The temperature sensor 33 is adapted to monitor intake manifold air temperature.

External flow passage 40 recirculates exhaust gas from the exhaust passage 39 to the intake manifold 30 of the air intake system, having an air flow control valve comprising an exhaust gas recirculation ('EGR') valve 38. A second temperature sensor 35 is adapted to monitor the temperature of the recirculated exhaust gas, preferably at or near the EGR valve 38. The EGR valve 38 preferably comprises a controllable variable flow valve that is controlled by a pulsewidth-modulated solenoid that is operatively connected to the control module 5. The control module 5 generates a pulsewidth control signal ('EGR_PW') to control flow of recirculated exhaust gas, or external EGR gas, through the EGR valve 38. The EGR valve 38 preferably generates an output signal monitored by the control module 5 related to operation. An external EGR gas flowrate through the EGR valve 38 to the intake manifold 30 can determined based upon a pressure drop across the EGR valve 38, a temperature of the external EGR gas, and an effective opening area of the EGR valve 38. The control module 5 includes a predetermined calibration consisting of a pulsewidth control signal for controlling the EGR valve 38 and a corresponding measure of the effective opening area of the EGR valve 38. In operation, the control module 5 controls the effective opening area by controlling the pulsewidth control signal to the EGR valve 38. Thus, the control module 5 controls the external EGR gas flowrate by controlling the pulsewidth control signal to the EGR valve 38. By way of example, a pulsewidth control signal of 0% renders the EGR valve 38 closed, i.e., no flow, and a pulsewidth control signal of 100% renders the EGR valve 38 wide-open, resulting in a maximum external EGR gas flowrate for the pressure drop across the EGR valve 38. The system operation by which the control module 5 determines the pulsewidth control signal to control the external EGR gas flowrate is described with reference to FIG. 2.

A fuel injection system comprises a plurality of fuel injectors 28, each adapted to directly inject a mass of fuel into one of the combustion chambers 16, in response to a control signal ('INJ_PW') from the control module 5. The fuel injectors 28 are supplied pressurized fuel from a fuel distribution system (not shown). Alternatively, each fuel injector 28 can be positioned to inject fuel into the intake passage 29 upstream of the combustion chamber 16, with fuel and air flowing into the combustion chamber 16 upon opening of the intake valve(s) 20. A cylinder charge is formed in each combustion chamber 16 during each cylinder event consisting of the injected mass of fuel, the intake air, the EGR gas, and any residual gases remaining in the combustion chamber 16. A spark ignition system comprising an ignition module (not shown) and a spark plug 24 generates spark energy in the combustion chamber 16 for igniting or assisting in igniting each cylinder charge, in response to an ignition signal ('IGN') output from the control module 5.

The control module 5 determines an operator torque request for engine power output, including engine torque and speed, based upon an operator input ('APP') to an accelerator pedal via an accelerator pedal sensor 52.

The control module 5 comprises a general-purpose digital computer including a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module 5 has a set of control algorithms, comprising resident program instructions and calibrations stored in the non-volatile memory and executed to provide the respective functions for controlling the engine 10. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the various sensors to determine states of engine parameters. The control module 5 executes algorithmic code stored therein to control the aforementioned actuators to form the cylinder charge, including controlling throttle position, spark ignition timing, fuel injection mass and timing, EGR valve position to control flow of recirculated exhaust gases, and intake and/or exhaust valve timing and phasing on engines so equipped.

Figure 2:
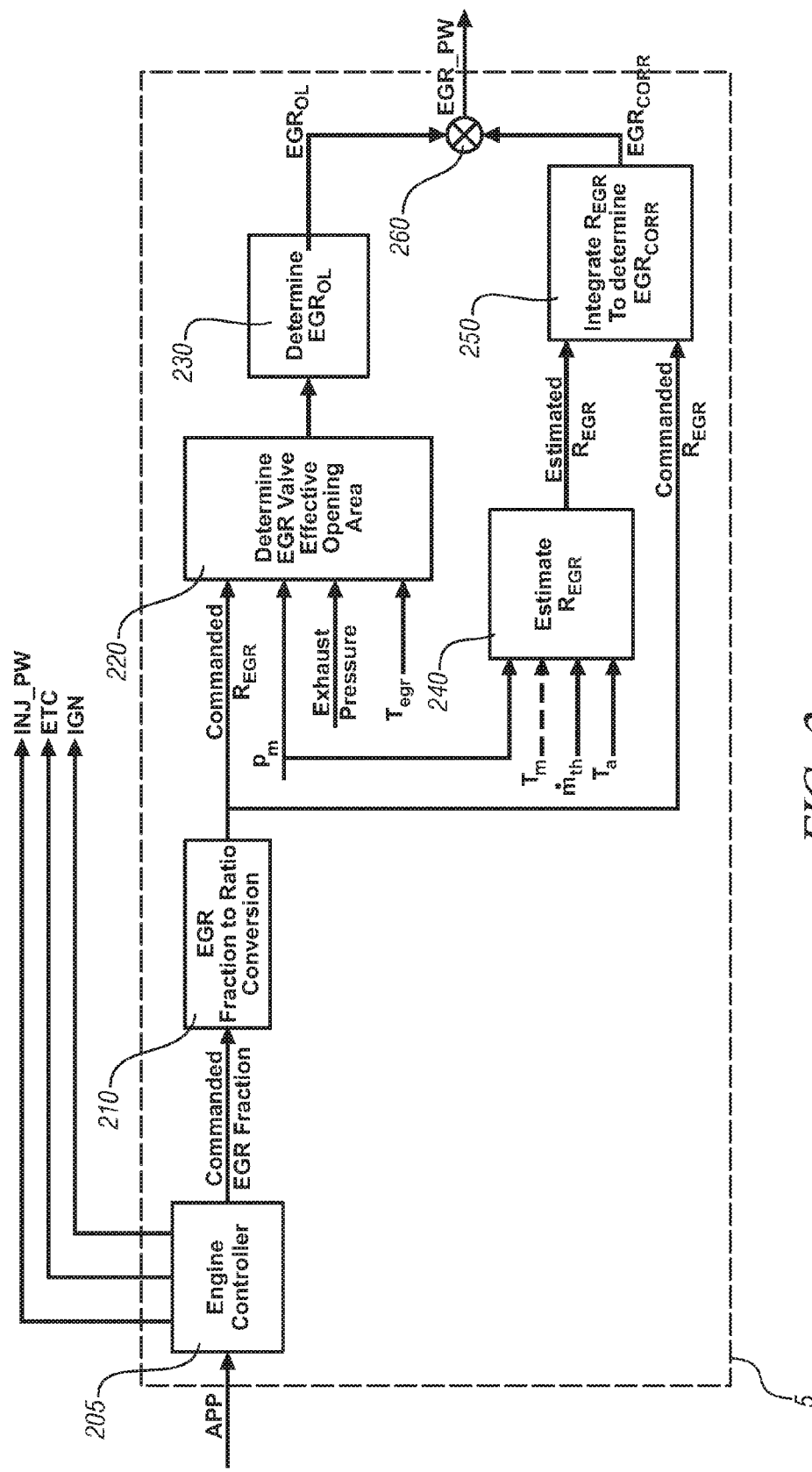

FIG. 2 schematically depicts operation of the system as executed on the exemplary engine 10 depicted in FIG. 1 to control the external EGR gas flowrate. The control module 5 determines an engine operating point, consisting of an operating speed and torque output, based upon the operator torque request and other torque requests, e.g., engine accessory controls and power demands from a hybrid control module when the engine 10 is an element of a hybrid powertrain. The operator torque request is determined based upon the operator input ('APP') to the accelerator pedal 52. An engine controller determines commands for the various engine actuators to control engine operation to achieve the engine operating point [205]. This includes controlling the fuel mass from the fuel injector 28 via the control signal INJ_PW, controlling the throttle position for the throttle valve 34 via the control signal ETC, and controlling spark ignition timing for the spark plug 24 via the control signal IGN. A commanded EGR fraction for a cylinder charge is determined based upon the engine operation, including the engine operating point. Preferably, the commanded EGR fraction is set to be a maximum EGR fraction the engine 10 can tolerate without excessive combustion instability. The commanded EGR fraction for the cylinder charge is converted to a commanded EGR ratio in the intake manifold 30 using known equations [210]. The control module 5 executes a calculation to compute an effective opening area of the EGR valve 38 to control the EGR gas flowrate to achieve the commanded EGR ratio in the intake manifold 30 [220]. The effective opening area of the EGR valve 38 is determined based upon the EGR gas temperature ('$T_{egr}$'), exhaust pressure ('Exhaust Pressure'), intake manifold pressure ('$p_m$'), and the commanded EGR ratio ('Commanded $R_{EGR}$') 220. This is converted to a feed-forward EGR command ('$EGR_{OL}$') to control the EGR valve 38 based upon the predetermined calibration of the EGR valve 38 [230]. The feed-forward command to control the EGR valve 38 is based upon a determination of the commanded EGR ratio in the intake manifold 30, and is not intended to substitute for a feedback sensor providing position or other feedback for the EGR valve 38.

The control module 5 executes algorithmic code to estimate the EGR ratio in the intake manifold 30 during the ongoing engine operation based upon inputs of intake manifold air temperature ('$T_m$'), mass air flowrate ('$\dot{m}_{th}$'), intake temperature ('$T_a$'), and intake manifold pressure ('$p_m$') [240]. These inputs are obtained from monitoring signal outputs from the engine sensors described herein. The EGR ratio in the intake manifold 30 is determined by execution of algorithmic code consisting of equations described below. The EGR ratio is used to control operation of the EGR valve 38, thus controlling the external EGR gas flowrate into the intake manifold 30 and each combustion chamber 16 to form each cylinder charge.

The EGR ratio in the intake manifold 30 can be computed, as in Eq. 1:

$$R_{EGR} = \frac{m_{c,EGR}}{m_{c,air}} \quad [1]$$

wherein: $m_{c,EGR}$ comprises a mass of recirculated exhaust gas, and $m_{c,air}$ comprises a mass of fresh air.

A total mass charge entering each combustion chamber 16 comprises the sum of the mass of recirculated exhaust gas and the mass of fresh air, which together comprise the gas portion of the cylinder charge. Pressure dynamics in the intake manifold 30 are modeled based upon the ideal gas law, to model the EGR ratio, as in Eq. 2:

$$p_m = R_a * T_m * m_m / V_m \quad [2]$$

wherein: $p_m$ denotes the intake manifold pressure, $R_a$ denotes the gas constant of air, $T_m$ denotes the intake manifold temperature, $m_m$ denotes the gas mass in the intake manifold 30, and $V_m$ denotes intake manifold volume.

Partial differential analysis is applied to Eq. 2 to yield more complete understanding, including determining a time-rate of change in a partial air pressure in the intake manifold 30, i.e., $\dot{p}_{m,a}$. The time-rate change in the partial air pressure in the intake manifold during dynamic engine operation is determined as in Eq. 3:

$$\dot{p}_{m,a} = \frac{\kappa R}{V_m}(\dot{m}_{th}T_a - \dot{m}_{m,a}T_m) \quad [3]$$

$$= \frac{\kappa R}{V_m}\left(\dot{m}_{th}T_a - \frac{\eta(p_m,\omega)V_d}{R}\omega\right)$$

wherein: $T_m$ comprises the intake manifold air temperature at temperature sensor 33;

$p_m$ comprises the intake manifold pressure at pressure sensor 36, $V_m$ comprises the volume of the intake manifold 30, $\dot{m}_{th}$ comprises mass air flowrate, at the mass airflow sensor 32, $T_a$ comprises the intake air temperature at the mass airflow sensor 32, $\dot{m}_{m,a}$ comprises partial air mass flow rate into the combustion chamber 16, $\kappa$ comprises an isentropic exponent, $\eta$ comprises volumetric efficiency, $\omega$ comprises engine angular velocity, measured with the crank sensor 42, $V_d$ comprises engine volumetric displacement, R comprises the universal gas constant, and $p_{m,a}$ comprises the partial air pressure in the intake manifold 30.

The time-rate change in the intake manifold air temperature during dynamic engine operation can be determined as described in Eq. 4:

$$\dot{T}_m = \frac{R_a T_m}{p_m V_m}\left(\begin{array}{c}-\dot{m}_{th}T_m\left(1-\frac{T_a}{T_{egr}}\right)+ \\ \dot{m}_c T_m\left(1-\frac{T_m}{T_{egr}}\right)\end{array}\right) + \frac{T_m}{p_m}\left(1-\frac{T_m}{\kappa T_{egr}}\right)\dot{p}_m \quad [4]$$

wherein: $R_a$ comprises the gas constant of air;

$T_{egr}$ comprises the temperature of the EGR gas, at sensor 35, and $\dot{m}_c$ comprises a mass flowrate into the combustion chamber 16.

The intake manifold pressure can be determined based upon the time-rate change in partial air pressure during dynamic engine operation. The intake manifold temperature can be determined based upon the time-rate change in the intake manifold air temperature during dynamic engine operation. The estimated EGR ratio ('Estimated $R_{EGR}$') in the intake manifold 30 is determined based upon the partial air pressure and the intake manifold air temperature, as in Eq. 5:

$$R_{EGR} = \frac{p_m}{p_{m,a}}\frac{T_a}{T_m} - 1 \quad [5]$$

The equations are reduced to machine code for execution in the control module 5 during one of the loop cycles during ongoing operation of the engine 10. Thus during the ongoing engine operation, states for the intake manifold pressure, the intake temperature, the intake manifold air temperature, the EGR gas temperature, and the intake air temperature are measured. Time-rate changes in the partial air pressure in the intake manifold and the intake manifold air temperature are determined in stepwise fashion by execution of Eqs. 3 and 4. The estimated EGR ratio in the intake manifold 30 can be converted to an EGR fraction for each cylinder charge is determined based upon the partial air pressure in the intake manifold and the intake manifold air temperature by execution of Eq. 5.

The estimated EGR ratio and the commanded EGR ratio are integrated and filtered to determine an EGR correction ('EGR$_{CORR}$') [250], which is added to the feed-forward EGR command, EGR$_{OL}$ [260]. The feed-forward EGR command and the EGR correction are added [260] to determine the final command ('EGR_PW') for controlling the EGR valve 38, thus controlling the EGR gas flowrate to achieve the commanded EGR fraction for each cylinder charge.

The system operation described with reference to FIG. 2 is regularly and periodically executed during ongoing engine operation, thus effecting a determination of the EGR ratio for each cylinder charge to control the EGR fraction for each cylinder charge. The algorithm for estimating the EGR ratio is preferably executed ongoingly when the EGR valve 38 is commanded open to provide active compensation for the feed-forward EGR control scheme.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling EGR gas flow in an internal combustion engine during ongoing operation, comprising:
    determining an engine operating point;
    determining a preferred EGR fraction for a cylinder charge based upon the engine operating point;
    determining a feed-forward command for controlling an external EGR gas flowrate to an engine intake manifold based upon the preferred EGR fraction for the cylinder charge;
    determining an intake manifold air temperature based upon an estimate of a change in the intake manifold air temperature;
    estimating an EGR ratio in the intake manifold based upon an intake manifold pressure, an intake air temperature, the intake manifold air temperature, and a partial air pressure in the intake manifold; and
    controlling the external EGR gas flowrate based upon the estimated EGR ratio in the intake manifold and the feed-forward command for controlling the external EGR gas flowrate.

2. The method of claim 1, further comprising estimating the change in the intake manifold air temperature based upon a mass air flowrate, an EGR gas temperature, and the intake air temperature.

3. The method of claim 2, comprising monitoring signal inputs from sensors to provide the intake manifold air temperature, the mass air flowrate, the intake air temperature, an intake manifold pressure, and the EGR gas temperature.

4. The method of claim 1, wherein the engine operating point comprises an engine speed and load operating point at an engine idle condition.

5. The method of claim 1, further comprising adjusting the feed-forward command for controlling the external EGR gas flowrate based upon the estimated EGR ratio in the intake manifold.

6. The method of claim 5, further comprising adjusting the feed-forward command for controlling the external EGR gas flowrate based upon the estimated EGR ratio in the intake manifold to achieve the preferred EGR fraction for the cylinder charge.

7. Method for controlling a spark-ignition direct injection internal combustion engine, comprising determining an engine operating point;
   monitoring an air temperature in an intake manifold, an EGR gas temperature, a mass flowrate of the intake air, an intake manifold pressure, and an intake air temperature;
   determining a preferred EGR fraction for a cylinder charge for the engine operating point;
   estimating a partial air pressure in the intake manifold and the air temperature in the intake manifold, wherein estimating the air temperature in the intake manifold comprises estimating a change in the air temperature in the intake manifold based upon the mass flowrate of the intake air, the EGR gas temperature, the intake air temperature and the intake manifold pressure;
   estimating an EGR ratio in the intake manifold based upon the estimated partial air pressure in the intake manifold and the estimated air temperature in the intake manifold; and,
   controlling operation of an EGR valve based upon the estimated EGR ratio in the intake manifold.

8. The method of claim 7, wherein estimating the change in the air temperature in the intake manifold further comprises:
   reducing a mathematical equation for calculating a time-rate change in the air temperature in the intake manifold to executable machine code;
   monitoring inputs from sensors adapted to monitor the air temperature in the intake manifold, the EGR gas temperature, the mass flowrate of the intake air, the intake manifold pressure, and the intake air temperature; and,
   periodically executing the machine code.

9. The method of claim 7, wherein estimating a partial air pressure in the intake manifold is based upon the mass flowrate and temperature of the intake air, the air temperature in the intake manifold, and the intake manifold pressure.

10. The method of claim 7, wherein controlling operation of the EGR valve based upon the estimated EGR ratio in the intake manifold comprises controlling an external EGR gas flowrate based upon the estimated EGR ratio in the intake manifold.

11. The method of claim 10, further comprising adjusting a feed-forward command for controlling the external EGR gas flowrate based upon the estimated EGR ratio in the intake manifold to achieve the preferred EGR fraction for the cylinder charge.

12. Method for controlling external EGR gas flowrate to an intake manifold of an internal combustion engine during ongoing operation, comprising:
   measuring an air temperature in the intake manifold, an intake air temperature, an intake manifold pressure, and a mass air flowrate;
   estimating a partial air pressure in the intake manifold and the air temperature in the intake manifold during the ongoing operation;
   estimating an EGR ratio in the intake manifold based upon the air temperature in the intake manifold, the intake air temperature, the intake manifold pressure, and the partial air pressure in the intake manifold; and
   controlling operation of an EGR valve based upon the estimated EGR ratio in the intake manifold, further comprising:
   determining an engine operating point;
   determining a preferred EGR fraction for a cylinder charge based upon the engine operating point;
   determining a feed-forward command for controlling the operation of the EGR valve for controlling external EGR gas flowrate based upon the preferred EGR fraction for the cylinder charge; and
   adjusting the feed-forward command for controlling the operation of the EGR valve based upon the estimated EGR ratio in the intake manifold.

13. The method of claim 12, wherein estimating the air temperature in the intake manifold comprises estimating the air temperature in the intake manifold based upon a cylinder mass flowrate, an EGR gas temperature, a mass flowrate of the intake air, and the intake air temperature.

14. The method of claim 12, wherein adjusting the feed-forward command for controlling the operation of the EGR valve based upon the estimated EGR ratio in the intake manifold comprises controlling operation of the EGR valve to achieve the preferred EGR fraction for the cylinder charge.

* * * * *